UNITED STATES PATENT OFFICE 2,536,970

DIETETIC CANNED FRUITS AND METHODS OF MAKING THE SAME

Clair A. Weast, Manteca, Calif.

No Drawing. Application November 5, 1947,
Serial No. 784,295

18 Claims. (Cl. 99—186)

The present invention relates to dietetic foods; and more particularly to dietetic canned fruits and methods of making the same.

Diabetics, the obese, and others who must restrict their intake of carbohydrates are thereby deprives from eating foods prepared with sugar, such as canned fruits. Since many foods are not particularly palatable unless sweetened, the existence of such persons is made drab by the flat taste of their diets. Even worse, the present unavailability of unsweetened canned fruits often deprives these unfortunate persons of an adequate supply of vitamins, minerals, and other food constituents present in the fruits themselves.

The use of saccharin to artificially sweeten foods of course is well known, and it has been long established that saccharin is safe for such use. Unfortunately, saccharin leaves a bitter after-taste when imbibed in concentrations greater than about 0.01%; and it has a bitter taste to some individuals in even far smaller concentrations. An even worse disadvantage of saccharin is that many foods, particularly fruits and fruit juices, when sweetened therewith, become bitter on standing or cooking. Because of this property, attempts to pack canned fruit with saccharin have hithertofore uniformly been unsuccessful, the product showing a bitter off-taste as soon as the processing was completed.

I have now discovered, surprisingly enough, that fruits and the like canned with both saccharin and added pectin have a palatable sweet taste free from the unpleasant by-taste of saccharin. This coaction of pectin and saccharin is most unexpected, for the pectin inhibits the characteristic bitter taste of the saccharin without affecting the sweet taste thereof. The conjoint incorporation of pectin and saccharin in foodstuffs (a) minimizes or eliminates the characteristic by-taste which some people encounter from saccharin; (b) permits the use of saccharin by normal-tasting persons in concentrations greater than 0.01% and as high as 0.05% without unpleasant after-taste; and (c) stabilizes the artificially sweetened food so that it does not become bitter upon cooking or standing.

Accordingly, it is a principal object of the present invention to provide artificially sweetened foods which are stable and do not become bitter upon cooking or standing.

A more specific object is to provide dietetic canned fruits containing no added sugar, sweetened with a mixture of saccharin and pectin, and characterized by flavor stability and freedom from undesirable side-taste or after-taste.

Another object is to provide practical methods of making my new improved dietetic foods.

Yet another object is to provide a novel sweetening composition for use in practicing the processes of the present invention, and comprising saccharin flavor stabilized with pectin.

Still another important object is to provide novel methods of inhibiting the disagreeable taste of saccharin in canned fruits and the like.

For purposes of convenience and clarity in exposition, my invention will be illustrated with particular reference to canned fruits, but it is to be distinctly understood that the scope of my invention includes generally foods sweetened with physiologically coacting combinations of saccharin and pectin.

In the case of canned fruits generally, the objectives of my invention are achieved by incorporating pectin in amounts from about 15 to about 50 times the saccharin content. The saccharin may vary from as low as 0.005% to as high as 0.05% of the weight of the finished product. The preferred commercial canned fruits embodying my invention contain from 0.02% to 0.05% saccharin, together with from 0.5% to 1.5% pectin.

In canned fruits, substantial flavor stabilization is apparent when the pectin content of the canned fruit is 15 times the saccharin thereof. Generally speaking, the best flavor stabilization is obtained when the ratio of pectin to saccharin in the finished canned fruit is in the order of 30:1 to 40:1; but edible and desirable formulations may be obtained with higher ratios, such as 50:1.

As used in this specification and the appended claims, the term saccharin includes both ordinary saccharin

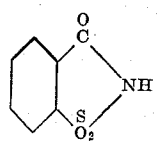

and soluble saccharin (saccharin sodium)

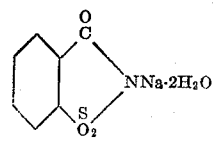

Ordinary saccharin is soluble to the extent of 0.43 gram per 100 cc. water at 25° C. If it is desired to use a greater concentration of ordinary saccharin in the packing medium, it is necessary to warm said medium sufficiently to dissolve all said saccharin, or else to use soluble saccharin.

The term "canned" herein means sealed in a container after processing by heat to prevent spoilage, regardless whether the container is a tin can, a bottle, or any other hermetically sealed enclosure.

I have prepared and tested, and many people have eaten, many forms of my invention, including by way of example, dietetic canned fruits including apricots, cherries, peaches (both freestone and clingstone), pears, nectarines, Kadota figs (both with and without added lemon juice); and various mixtures of the foregoing and other fruits. My invention also includes canned dietetic fruit juices, such as apricot juice, peach juice, pear juice, and mixtures thereof, sweetened with saccharin stabilized with added pectin.

In order more fully to disclose the invention, even to details, the following examples are recited by way of illustration and not of limitation.

EXAMPLE I

*Canned apricots*

Mature apricots are pitted and halved, graded for size, washed and sorted, in accordance with standard commercial practice. The fruit is filled into cans, an average of 19¾ oz. avoir. being placed in each No. 2½ size can. The can is then filled with liquid medium, which requires 10 to 12 fluid ounces thereof, depending upon the size of the fruit. A suitable liquid medium is made by dissolving 15 pounds of 150 grade citrus pectin and 13⅓ ounces saccharin in water to make 100 gallons. This gives a liquid medium analyzing 1.8% pectin and 0.1% saccharin.

The filled cans are exhausted by heating in accordance with conventional canning practice until a closing center temperature of 160° to 170° F. is attained; the container is then hermetically sealed, as for example by the usual double seaming operation, and processed by heating so as to prevent spoilage, typically for 20 to 30 minutes at 212° F. in a continuous agitating cooker.

The finished container will show from 10 to 15 inches vacuum at room temperature, and the fruit therein possesses the color and texture typical of ordinary commercial canned apricots. The product corresponds in sweetness to ordinary canned apricots packed in light syrup, but the viscosity of the liquid therein is more than twice that of the liquid in ordinary apricots canned in heavy syrup. To persons of normal taste response, the product is free of bitter by-taste and bitter after-taste, and remains so even when stored in the sealed container for periods of many months.

A typical run of my dietetic canned apricots prepared as above described analyzed as follows:

TABLE I.—ANALYSIS OF DIETETIC CANNED APRICOTS

| | |
|---|---|
| Pectin _____per cent__ | 1.3 |
| Saccharin _____do____ | 0.034 |
| Carbohydrate _____do____ | 8.6 |
| Protein _____do____ | 0.66 |
| Fiber _____do____ | 0.4 |
| Ash _____do____ | 0.4 |
| Water _____do____ | 88.5 |
| Calories per 100 grams _____ | 35 |
| Calories per pound _____ | 160 |

It is to be noted that the pectin and saccharin content of the finished product is quite different from that of the liquid medium in which the raw fruit was packed, because during processing the saccharin and pectin become distributed through both the solid and the liquid portions of the canned fruit. Of the 1.3% total pectin shown by analysis in the finished product, 0.6% is supplied by the pectin added with the liquid medium, and 0.7% represents pectin naturally present in the apricots.

The procedure of Example I may be applied to the production of dietetic canned apricots in other forms, such as slices, cubes, or whole fruit, and also to the preparation of dietetic canned cherries, peaches, pears, nectarines, etc. The proportion of saccharin of course may be varied to suit the taste, and the proportion of pectin adjusted accordingly. Any pectin of food grade may be employed. Commercial pectin is ordinarily standardized to the declared Bloom strength by dilution with dextrose. The minute quantity of carbohydrate thus introduced into the dietetic food is physiologically negligible; nevertheless if desired, the pectin may be standardized with a non-carbohydrate filler.

EXAMPLE II

*Dietetic canned peaches*

Peeled sliced peaches are filled into cans, one of my improved sweetening tablets is added thereto, the can is completely filled with water, and then exhausted, heat processed and sealed in a manner similar to that described in conjunction with Example I.

The tablet which I add may be made in an ordinary tablet press. One tablet containing 0.2 avoir. ounce pectin and 0.011 avoir. ounce saccharin is sufficient to sweeten one No. 2½ can of peaches. The ratio of pectin to saccharin in the tablets may be varied between 15:1 and 50:1, and the weight of the tablet predetermined to properly sweeten any preselected unit quantity of food.

A typical batch of dietetic canned peaches prepared according to Example II was found, upon chemical analysis, to have the following composition and properties:

TABLE II.—ANALYSIS OF DIETETIC CANNED PEACHES

| | |
|---|---|
| Pectin _____per cent__ | 1.4 |
| Saccharin _____do____ | 0.038 |
| Carbohydrate _____do____ | 7.5 |
| Protein _____do____ | 0.5 |
| Fiber _____do____ | 0.3 |
| Ash _____do____ | 0.3 |
| Water _____do____ | 89.9 |
| Calories per 100 grams _____ | 30 |
| Calories per pound _____ | 135 |

EXAMPLE III

*Dietetic canned Kadota figs*

A suitable liquid medium is prepared by dissolving 15 pounds of 150 grade pectin and 12 ounces of soluble saccharin in enough water to make 100 gallons. If desired, one gallon of lemon juice may be added for flavoring purposes. This liquid medium analyzes 1.8% pectin and 0.09% saccharin.

The figs are graded, sorted, washed and blanched in accordance with typical commercial practice. The fruit is filled into cans, the average filling weight amounting to 18¼ ounces avoir. per No. 2½ can. The remainder of the can is then filled with the liquid medium and the cans are exhausted, heated and sealed in the manner described in Example 1, except that the heating is continued for 30 to 40 minutes at 212° F.

The dietetic product thus obtained corresponds in sweetness to figs packed in light syrup, but the liquid portion thereof is far more viscous, the viscosity being more than twice that of the liquid obtained from ordinary canned figs in heavy syrup. To persons of normal taste response, the product is free of bitter by-taste and bitter after-taste, and remains so even when stored in the sealed container for periods of many months.

A typical run of my dietetic canned figs prepared according to Example III analyzed as follows:

TABLE III.—ANALYSIS OF DIETETIC CANNED FIGS

| | | |
|---|---|---|
| Pectin | per cent | 1.3 |
| Saccharin | do | 0.038 |
| Carbohydrate | do | 14.0 |
| Protein | do | 1.0 |
| Fiber | do | 1.2 |
| Ash | do | 0.4 |
| Water | do | 82.0 |
| Calories per 100 grams | | 59 |
| Calories per pound | | 270 |

Of the 1.3% total pectin shown by analysis in the finished product, 0.76% is supplied by the pectin added with the liquid medium, and 0.54% represents pectin naturally present in the figs.

From the foregoing detailed concrete examples, persons skilled in the art will have no difficulty in preparing dietetic canned fruits and other dietetic foods in accordance with the concept of the present invention.

Having thus disclosed improved methods of eliminating the undesirable side-taste of saccharin, methods of preparing dietetic canned fruits which are taste-stable and free of said undesirable side-taste, and dietetic foods resulting from the application of my improved processes and concepts, I claim:

1. Canned fruit having small amounts of saccharin and added pectin incorporated therein, the amount of added pectin being at least 15 times the amount of saccharin.

2. Canned fruit containing from 0.005% to 0.05% saccharin, and added pectin in amounts from 15 to 50 times the saccharin content.

3. Canned fruit containing from 0.02% to 0.05% saccharin, and from 0.5% to 1.5% added pectin.

4. Canned fruit comprising (a) at least one membe of the group consisting of apricots, figs and peaches; (b) water; (c) saccharin in amounts from 0.005% to 0.05% of the total weight of said canned fruit; and (d) added pectin in amount at least 15 times the weight of said saccharin.

5. Dietetic canned apricots containing about 0.03% saccharin and about 0.6% added pectin.

6. Apricots canned with substantially no added sugar, and containing from 0.005% to 0.05% saccharin, and from 15 to 50 times as much added pectin as saccharin.

7. Dietetic canned Kadota figs containing from 0.005% to 0.05% saccharin, and from 15 to 50 times as much added pectin as saccharin.

8. Canned figs containing substantially no added sugar, and containing approximately 0.04% saccharin and approximately ¾% added pectin.

9. A dietetic food comprising peaches, water, added pectin and saccharin, wherein the saccharin content is 0.005% to 0.05% of the whole, and the pectin content is at least 15 times the saccharin content.

10. A sweetening composition which imparts no bitter taste to substances sweetened therewith, comprising saccharin intimately mixed with at least 15 times its weight of pectin.

11. The method of inhibiting the disagreeable taste of saccharin in canned fruits containing the same, which comprises incorporating pectin therewith in an amount which is at least 15 times the saccharin content thereof.

12. The method of inhibiting undesirable taste in fruits sweetened with saccharin, which comprises adding thereto pectin in amounts from 15 to 50 times the saccharin content thereof.

13. The method of making dietetic canned fruit, which comprises cooking fruit in a mixture of saccharin, pectin and water, the pectin content of said mixture in excess of the natural pectin content of said fruit being from 15 to 50 times the saccharin content thereof.

14. The method of making dietetic canned fruit, which comprises cooking fruit in an aqueous medium including pectin and from 0.01% to 0.5% saccharin, the pectin content of said aqueous medium in excess of the natural pectin content of said fruit being from 15 to 50 times the saccharin content thereof.

15. The method of inhibiting the disagreeable by-taste of saccharin in apricots sweetened therewith, which comprises cooking the same with added pectin in amounts between 30 and 40 times the weight of the saccharin.

16. The method of inhibiting the disagreeable after-taste of saccharin in figs sweetened therewith, which comprises adding pectin thereto in amounts between 30 and 40 times the saccharin content.

17. The method of preventing bitter taste in peaches sweetened with saccharin, which comprises cooking said peaches and saccharin with an amount of added pectin at least 15 times as great as the quantity of saccharin.

18. The method of inhibiting the disagreeable by-taste of saccharin in peaches sweetened therewith, which comprises adding pectin thereto in amounts between 30 and 40 times the weight of the saccharin.

CLAIR A. WEAST.

REFERENCES CITED

The following references are of record in the file of this patent:

UNITED STATES PATENTS

| Number | Name | Date |
|---|---|---|
| 851,221 | Chaplin | Apr. 23, 1907 |

FOREIGN PATENTS

| Number | Country | Date |
|---|---|---|
| 524,877 | Great Britain | May 1939 |

OTHER REFERENCES

Elwell: "Pectin, its Manufacture, Properties and Uses," pages 12 and 13, University of Washington, published by Belle Reeves, Secretary of State, Jan. 1939.

Baker: "Pectin in Nature and Industry," Scientific Monthly, Jan. 1935, pages 48 and 51.

Chem. Abstracts, vol. 36, page 578.